(12) United States Patent
Park et al.

(10) Patent No.: US 7,203,375 B2
(45) Date of Patent: Apr. 10, 2007

(54) QUANTIZATION ERROR COMPENSATION APPARATUS AND METHOD THEREOF

(75) Inventors: Yung-jun Park, Yongin (KR);
Jae-hwan Oh, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 810 days.

(21) Appl. No.: 10/614,793

(22) Filed: Jul. 9, 2003

(65) Prior Publication Data

US 2004/0076339 A1 Apr. 22, 2004

(30) Foreign Application Priority Data

Jul. 18, 2002 (KR) .............................. 2002-42208

(51) Int. Cl.
| | |
|---|---|
| G06K 9/36 | (2006.01) |
| G06K 9/38 | (2006.01) |
| G06K 9/46 | (2006.01) |
| G06K 9/40 | (2006.01) |
| G06K 9/32 | (2006.01) |
| G06K 15/00 | (2006.01) |
| H04N 7/12 | (2006.01) |
| H04N 11/02 | (2006.01) |
| H04N 11/04 | (2006.01) |
| H04N 1/40 | (2006.01) |
| G06T 5/00 | (2006.01) |
| H04B 1/66 | (2006.01) |
| G06K 9/48 | (2006.01) |
| G06K 9/60 | (2006.01) |

(52) U.S. Cl. .................... 382/251; 382/242; 382/275; 382/298; 382/302; 348/404.1; 358/3.03; 358/3.26; 375/229; 375/240.03; 375/240.19; 375/240.22; 375/254

(58) Field of Classification Search ........ 382/251–253, 382/242, 275, 298–299, 302; 348/405, 404.1, 348/405.1; 358/3.03, 3.04, 3.05, 3.26; 375/229, 375/232, 240.01–240.03, 240.19, 240.22, 375/254
See application file for complete search history.

(56) References Cited

U.S. PATENT DOCUMENTS 3,343,087 A * 9/1967 Helms ...................... 375/243

(Continued)

OTHER PUBLICATIONS

Jiebo, Luo et al. "A Scene Adaptive and Signal Adaptive Quantization for Subband Image and Video Compression Using Wavelets" *IEEE Transactions on Circuits and Systems for Video Technology* vol. 7, No. 2, Apr. 1997, pp. 343-357.

(Continued)

*Primary Examiner*—Bhavesh M. Mehta
*Assistant Examiner*—Manav Seth
(74) *Attorney, Agent, or Firm*—Staas & Halsey LLP

(57) ABSTRACT

A quantization error compensation includes a dividing unit to divide an input current image signal into a first high-frequency signal and a low-frequency signal; a changing unit to replace bits of the first high-frequency signal with a predetermined signal to output a second high-frequency signal; an adding unit to add the low-frequency signal and the second high-frequency signal to create a composite signal; a quantization unit to cut n number of bits of the composite signal and to output the cut composite signal and the n number of bit signal; an equalizing unit to output a brightness equalizing value of the cut composite signal; a calculating unit to calculate a compensation value using the n number of the bit signal and a difference between brightness equalizing values with respect to a current and next brightness levels; and a compensation unit to add the compensation and the current brightness equalizing values.

30 Claims, 4 Drawing Sheets

U.S. PATENT DOCUMENTS

| | | | | |
|---|---|---|---|---|
| 4,677,479 A | * | 6/1987 | Hatori et al. | 382/251 |
| 5,208,871 A | * | 5/1993 | Eschbach | 382/252 |
| 5,568,570 A | * | 10/1996 | Rabbani | 382/252 |
| 5,629,780 A | * | 5/1997 | Watson | 382/250 |
| 5,903,676 A | * | 5/1999 | Wu et al. | 382/244 |
| 5,959,696 A | | 9/1999 | Hwang | |
| 6,005,623 A | * | 12/1999 | Takahashi et al. | 375/240.16 |
| 6,249,614 B1 | * | 6/2001 | Kolesnik et al. | 382/251 |

OTHER PUBLICATIONS

Gi Hun Lee et al. "Three-Dimensional DCT/WT Compression Using Motion Vector Segmentation for Low-Bit-Rate Video Coding" *Image Processing*, Oct. 1997 pp. 456-459.

European Search Report for Application No. 03016326.5; dated Aug. 2, 2006.

* cited by examiner

QUANTIZATION ERROR COMPENSATION APPARATUS AND METHOD THEREOF

CROSS-REFERENCE TO RELATED APPLICATION

This application claims the benefit of Korean Application No. 2002-42208, filed Jul. 18, 2002 in the Korean Intellectual Property Office, the disclosure of which is incorporated herein by reference.

BACKGROUND OF THE INVENTION

1. Field of the Invention

The present invention relates to a quantization error compensation apparatus and a method thereof, and more particularly, to a quantization error compensation apparatus and a method thereof for adaptively compensating for an input brightness signal by using a brightness signal difference that is caused by the quantization of continuously input image signals 2. Description of the Related Art Among the several methods for enhancing contrast of a displayed image, a histogram equalizing method has been widely used. Generally, since the histogram equalizing method provides an effect of stretching a dynamic range, it makes a flat gray distribution of an image and thus results in an enhancement of the contrast of the image. The known histogram equalizing method uses a transfer function that is obtained for each pixel independently, regardless of a correlation with a neighboring pixel. For example, pixel brightness levels 1 and 2 of an input image signal as shown in FIG. 1A are output to be brightness levels 0 and 3 as shown in FIG. 1B by a predetermined transfer function.

When an image signal is processed in the conventional histogram equalizing method, stripes (such as a contour line) are generated around a boundary where the correlation between the neighboring pixels is changed, thereby deteriorating the image quality.

SUMMARY OF THE INVENTION

The present invention has been developed in order to solve the above and other problems in the art. Accordingly, it is an aspect of the present invention to provide a quantization error compensation apparatus and a method thereof to perform compensation with respect to input image signals in consideration of a correlation between the continuously input image signals, thereby resulting in an improved image quality.

Additional aspects and/or advantages of the invention will be set forth in part in the description which follows and, in part, will be obvious from the description, or may be learned by practice of the invention.

The above and/or other aspects of the present invention can be achieved by providing a quantization error compensation apparatus comprising a frequency dividing unit for dividing an input current image signal expressed by a level 1 into a first high-frequency signal and a low-frequency signal, wherein the first high-frequency signal is expressed by a level 2 extended from the level 1 and the low-frequency signal is expressed by a level 3 extended from the level 1, and outputting the divided signal; a resolution-changing unit for cutting m number of Least Significant Bits (LSB) of the first high-frequency signal output from the frequency dividing unit and inserting a predetermined signal into a position from which the m LSBs were cut to thereby output a second high-frequency signal; an adding unit for adding the low-frequency signal and the second high-frequency signal to thereby create a composite signal; a quantization unit for cutting n number of LSBs of the composite signal and outputting the cut composite signal and the n number of bit signal; an equalizing unit for equalizing the cut composite signal according to a predetermined brightness equalizing pattern and outputting a brightness equalizing value; a compensation value calculating unit for calculating a compensation value by using the n number of the bit signal and a difference value between a first brightness equalizing value with respect to a brightness level of a pixel of the current image signal and a brightness equalizing value with respect to a next level of the brightness level of the pixel of the current image signal; and a compensation unit for adding the calculate compensation value and the first brightness equalizing value and outputting the added value.

Also, the above and/or other aspects are achieved by providing a quantization error compensation method, comprising dividing an input current image signal expressed by a level 1 into a first high-frequency signal and a low-frequency signal, wherein the first high-frequency signal is expressed by a level 2 extended from the level 1 and the low-frequency signal is expressed by a level 3 extended from the level 1, and outputting the divided signal; cutting m number of Least Significant Bits (LSB) of the first high-frequency signal output and inserting a predetermined signal into a position from which the m LSBs were cut to thereby output a second high-frequency signal; adding the low-frequency signal and the second high-frequency signal to thereby create a composite signal; quantizing the composite signal by cutting n number of LSBs of the created composite signal and outputting the cut composite signal and the n number of bit signal; equalizing the cut composite signal according to a predetermined brightness equalizing pattern; calculating a compensation value using the cut n number of the bit signal and a difference value between a first brightness equalizing value with respect to a brightness level of a pixel of the current image signal output from the equalizing step and a second brightness equalizing value with respect to a next level of the brightness level of the pixel of the current image signal; and adding the calculated compensation value and the first brightness equalizing value and outputting the added value.

According to the present invention, there is provided a quantization error compensation apparatus for adjusting a brightness level of a current image signal, including a replacement unit to replace a portion of the current image signal within a predetermined frequency band with a predetermined signal so as to produce a composite signal; a quantization unit to remove a portion of the composite signal and to output the cut composite signal and the portion of the composite signal; an equalizing unit to equalize the cut composite signal according to a predetermined brightness equalizing pattern and to output a first brightness equalizing value for the brightness level of the current image signal and a second brightness equalizing value for a next brightness level of the current image signal; a calculating unit to calculate a compensation value using the portion of the composite signal and the first and second brightness equalizing values; and a compensation unit to combine the compensation value and the first brightness equalizing value so as to compensate an area of the current image signal at which occurs a change in the brightness level.

The replacement unit comprises: a frequency dividing unit to divide the current image signal into a first signal and a second signal; a resolution-changing unit to replace a first portion of the first signal with the predetermined signal so as to produce a third signal; and a combining unit to combine the second signal and the third signal to generate the composite signal.

The current image signal is expressed by a level 1 and the first signal is a first high-frequency signal expressed by a level 2 extended from the level 1, and the second signal is a low-frequency signal expressed by a level 3 extended from the level 1.

The resolution-changing unit cuts m number of Least Significant Bits (LSB) of the first signal and inserts the predetermined signal into a position from which the m LSBs were cut to produce the third signal.

The quantization unit cuts n number of Least Significant Bits (LSB) of the composite signal and outputs the n number of a bit signal as the portion of the composite signal.

In calculating the compensation value, the calculating unit obtains a difference value between the first and second brightness equalizing values and multiplies the difference value by the portion of the composite signal.

The quantization unit cuts n number of Least Significant Bits (LSB) of the composite signal and outputs the n number of a bit signal as the portion of the composite signal.

The frequency dividing unit divides the current image signal into the first signal having a first number of bits and the second signal having a second number of bits; the resolution-changing unit includes an up-scaling unit which produces the third signal having the second number of bits; and the combining unit combines the second signal and the third signal to generate the composite signal having the second number of bits.

The quantization unit cuts n number of Least Significant Bits (LSB) of the composite signal and outputs the n number of a bit signal as the portion of the composite signal; and the compensation value is calculated as follows:

$$\text{Compensation}(y) = (LUT(y+1) - LUT(y)) * (n \text{ number of the bit signal})/A$$

where the compensation (y) denotes the compensation value, the LUT(y+1) denotes the second brightness equalizing value with respect to the next brightness level of a pixel of the current image signal, the LUT(y) denotes the first brightness equalizing value with respect to the brightness level of the pixel of the current image signal, and A is a difference between the first signal and the second signal.

Furthermore, according to the present invention, there is provided a computer readable medium encoded with processing instructions for performing a method of compensating a quantization error in a current image signal using a computer, the method comprising: replacing a portion of the current image signal within a predetermined frequency band with a predetermined signal so as to produce a composite signal; quantizing the composite signal including removing a portion of the composite signal and outputting the cut composite signal and the portion of the composite signal; equalizing the cut composite signal according to a predetermined brightness equalizing pattern so as to output a first brightness equalizing value for the brightness level of the current image signal and a second brightness equalizing value for a next brightness level of the current image signal; calculating a compensation value using the portion of the composite signal and the first and second brightness equalizing values; and combining the compensation value and the first brightness equalizing value so as to compensate an area of the current image signal at which occurs a change in the brightness level.

The replacing the portion comprises: dividing the current image signal into a first signal and a second signal; replacing a first portion of the first signal with the predetermined signal so as to produce a third signal; and combining the second signal and the third signal to generate the composite signal.

The current image signal is expressed by a level 1, and the first signal is a first high-frequency signal expressed by a level 2 extended from the level 1, and the second signal is a low-frequency signal expressed by a level 3 extended from the level 1.

The replacing the first portion comprises: cutting m number of Least Significant Bits (LSB) of the first signal, and inserting the predetermined signal into a position from which the m LSBs were cut to produce the third signal.

The quantizing the composite signal comprises: cutting n number of Least Significant Bits (LSB) of the composite signal, and outputting the n number of a bit signal as the portion of the composite signal.

The calculating the compensation value comprises: obtaining a difference value between the first and second brightness equalizing values, and multiplying the difference value by the portion of the composite signal.

The quantizing the composite signal comprises: cutting n number of Least Significant Bits (LSB) of the composite signal, and outputting the n number of a bit signal as the portion of the composite signal.

The dividing the current image signal comprises dividing the current image signal into the first signal having a first number of bits and the second signal having a second number of bits; the replacing the first portion of the first signal further comprises producing the third signal having the second number of bits; and the combing the second signal and the third signal comprising combining the second signal and the third signal to generate the composite signal having the second number of bits.

The quantizing the composite signal comprises: cutting n number of Least Significant Bits (LSB) of the composite signal, and outputting the n number of a bit signal as the portion of the composite signal; and the calculating the compensation value comprises:

$$\text{Compensation}(y) = (LUT(y+1) - LUT(y)) * (n \text{ number of the bit signal})/A$$

where the compensation (y) denotes the compensation value, the LUT(y+1) denotes the second brightness equalizing value with respect to the next brightness level of a pixel of the current image signal, the LUT(y) denotes the first brightness equalizing value with respect to the brightness level of the pixel of the current image signal, and A is a difference between the first signal and the second signal.

BRIEF DESCRIPTION OF THE DRAWINGS

These and/or other aspects and features of the present invention will be more apparent and more readily appreciated by describing embodiments of the present invention with reference to the accompanying drawings, in which.

DETAILED DESCRIPTION OF THE EMBODIMENTS

Figure 1A:
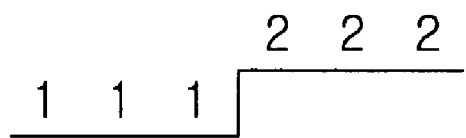
FIGS. 1A and 1B are views showing brightness levels of an input image signal and an output image signal processed by a conventional brightness equalizing method.
Figure 1B:
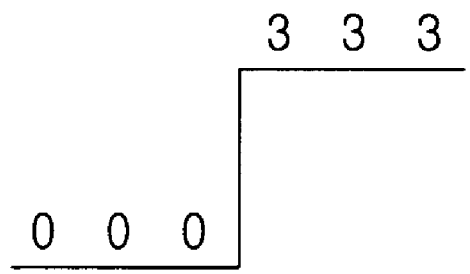

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
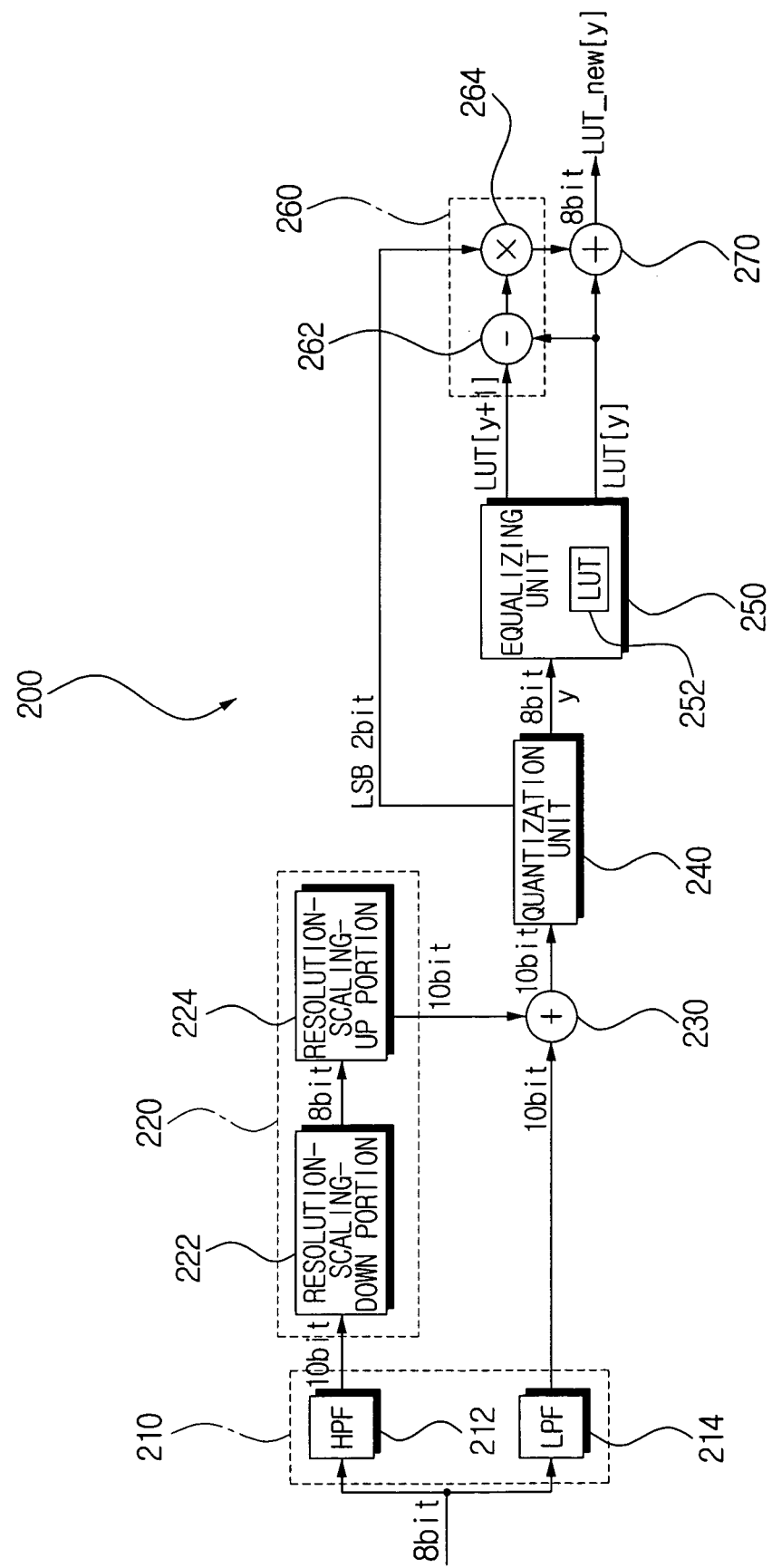
FIG. 2 is a block diagram showing a quantization error compensation apparatus according to an embodiment of the present invention.

FIG. 2 is a block diagram showing a quantization error compensation apparatus 200 according to an embodiment of the present invention. Referring to FIG. 2, the quantization error compensation apparatus 200 comprises a frequency-dividing unit 210, a resolution-changing unit 220, an adding unit 230, a quantization unit 240, an equalizing unit 250, a compensation value-calculating unit 260, and a compensation unit 270.

The frequency-dividing unit 210 has a High Pass Filter (HPF) 212 and a Low Pass Filter (LPF) 214. It is preferred, but not required, that the HPF 212 and LPF 214 use mirror filters. The mirror filter is designed to reproduce a pre-existing current image signal when a high-frequency signal and a low-frequency signal divided by a frequency band are compounded. Also, it is preferred, but not required, that the HPF 212 and LPF 214 are designed such that a ringing phenomenon does not occur. The ringing phenomenon is the state in which an unstable waveform appears in an output signal for a short time due to the sudden change of an input signal in electric and electronic circuits. However, it is understood that other types of HPF 212 and LPF 214 can be used.

Among current input image signals expressed by a level 1, the HPF 212 extracts a first high-frequency signal equal to or greater than a predetermined frequency. The first extracted high-frequency signal is expressed by a level 2 extended from the level 1 by the HPF 212. Among the current input image signals expressed by the level 1, the LPF 214 extracts a low-frequency signal smaller than the predetermined frequency. The extracted low-frequency signal is expressed by a level 3 extended from the level 1 by the LPF 214. The levels 2 and 3 can also be the same.

For example, if the level 1 of the current input image signal is 8 bits, the first high-frequency signal and the low-frequency signal are respectively expressed by 10 bits and 12 bits by the HPF 212 and the LPF 214, which are extended from the 8 bits of the image signal. Hereinafter, the level 1 is 8 bits and the levels 2 and 3 are 10 bits by way of an example.

The resolution-changing unit 220 has a resolution-scaling-down portion 222 and a resolution-scaling-up portion 224. The resolution-scaling-down portion 222 cuts m number of Least Significant Bits (LSB) of the first high-frequency signal output from the HPF 212 (m being a positive integer). By way of the shown example, the resolution-scaling-down portion 222 cuts 2 LSBs (m=2) from the signal of 10 bits to reduce the signal to 8 bits.

The resolution-scaling-up portion 224 inserts a predetermined signal to the position from which the 2 LSBs were cut by the resolution-scaling-down portion 222, and outputs a second high-frequency signal. This insertion is to bring about a change in a brightness level of the original signal by making a later generated signal by adding the low-frequency signal and the second high-frequency signal different from the original signal (i.e., the current image signal). That is, in the shown example, the resolution-scaling-up portion 224 inserts two '0' signals into the position from which the two bits are cut, using a Zero Padding, and generates the second high-frequency signal expressed by 10 bits.

The adding unit 230 adds the second high-frequency signal output from the resolution-scaling-up portion 224 and the low-frequency signal output from the LPF 214 to thereby generate a composite signal expressed by 10 bits. The quantization unit 240 cuts n number of LSBs of the composite signal generated by the adding unit 230 (n being a positive integer), and outputs the cut composite signal and the cut n number of bit signal. In other words, in the shown example, the quantization unit 240 cuts two LSBs (n=2) from the composite signal of 10 bits to thus generate a composite signal expressed by 8 bits. This cutting refers to discarding some part of the low-frequency signal.

Figure 3:
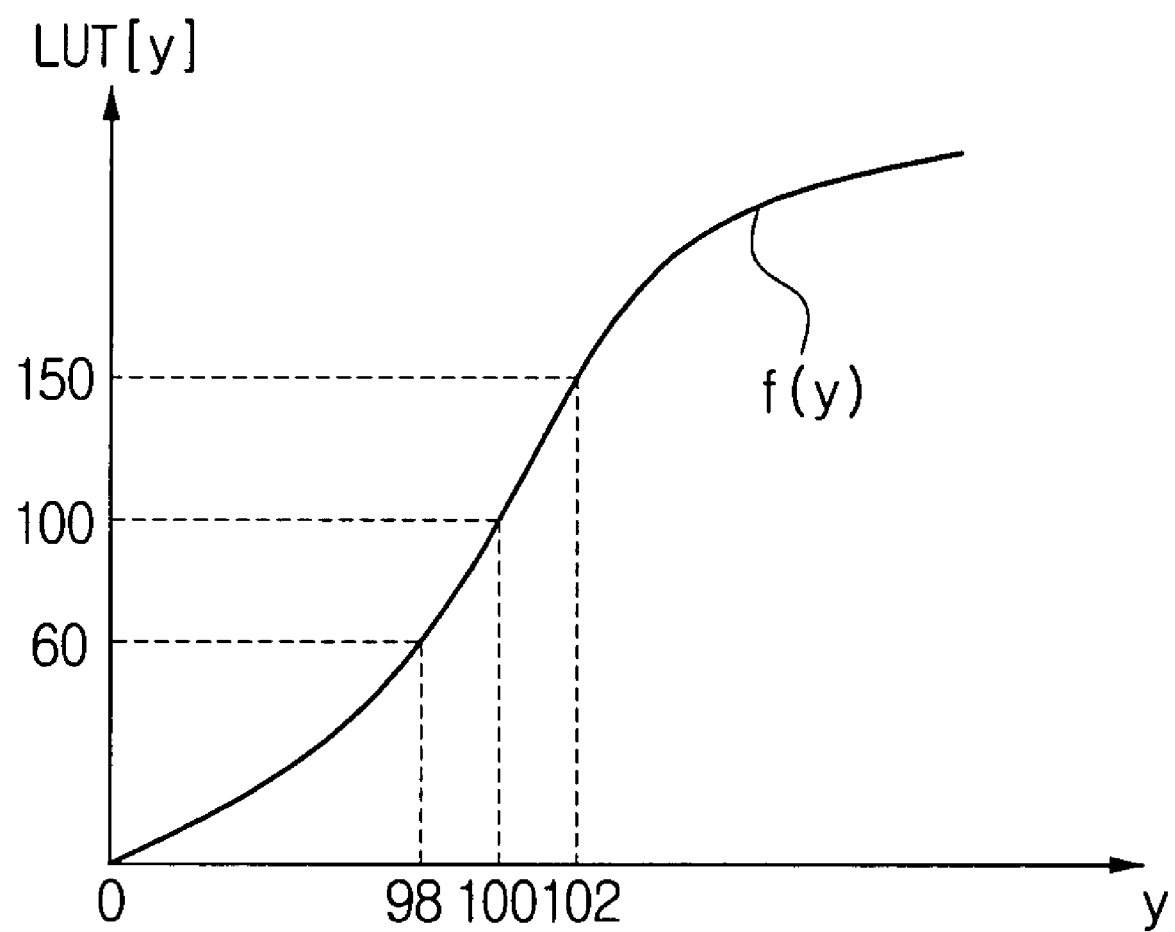
FIG. 3 shows a brightness equalizing pattern set by an equalizing unit of FIG. 2.

The equalizing unit 250 equalizes the composite signal cut by the quantization unit 240 (i.e., the signal expressed by 8 bits) according to a predetermined brightness equalizing pattern to thereby output a brightness equalizing value. FIG. 3 is a view showing the predetermined brightness equalizing pattern at the equalizing unit 250 of FIG. 2, by way of an example. Referring to FIG. 3, y denotes a brightness level of a pixel input to the equalizing unit 250, f(y) denotes a brightness equalizing pattern for generating a brightness equalizing value with respect to the y, and LUT(y) denotes a brightness equalizing value of the y. The brightness equalizing pattern is generally a transfer function used to calculate a brightness level of an output pixel corresponding to a brightness of an input pixel (i.e., a brightness equalizing value). The brightness equalizing pattern is pre-stored in a Look-up Table (LUT) 252 of the equalizing unit 250.

The compensation value calculating unit 260 shown in FIG. 2, has a subtracting portion 262 and a multiplying portion 264. The subtracting portion 262 calculates a difference value between a first brightness equalizing value LUT(y) of a brightness level of the pixel of the current image signal output from the equalizing unit 250 and a second brightness equalizing value LUT(y+1) of the next level of the brightness level of the pixel of the current image signal. The multiplying portion 264 calculates a compensation value by multiplying the difference value calculated by the subtracting potion 262 by the n number cut by the quantization unit 240 (i.e., the 2 bits of signal in the above example). As the compensation value compensates for the low-frequency component discarded by the quantization, the compensation value compensates for the difference value between the first brightness equalizing value LUT(y) with respect to the brightness level of the pixel of the current image signal and the second brightness equalizing value LUT(y+1) with respect to the next level of the brightness level of the pixel of the current image signal.

The compensation value calculating unit 260 calculates the compensation value compensation (y) according to the following Equation 1:

$$\text{Compensation}(y) = (LUT(y+1) - LUT(y)) * (LSB\ 2\text{bit value})/a \quad \text{Equation 1}$$

where the compensation (y) denotes the compensation value, the LUT(y+1) denotes the second brightness equalizing value with respect to the next level of the brightness level of the pixel of a current image signal, the LUT(y) denotes the first brightness equalizing value with respect to the brightness level of the pixel of the current image signal. The LSB 2 bit value denotes the two LSBs according to the present example. However, it is understood that the LSB value is dependent on the n number of the bit signal.

The 'a' denotes a division coefficient for changing 10 bits to 8 bits at the resolution-scaling-down portion 222. For example, when expanding the pixel brightness level y of the current image signal expressed by 8 bits to 10 bits, the division coefficient a is 4. When expanding the pixel brightness level y of the current image signal expressed by 8 bits to 12 bits, the division coefficient a is 16.

The compensation unit 270 adds the compensation value compensation (y) calculated by the multiplying portion 264 and the first brightness equalizing value LUT(y) thus output a final output brightness level LUT_new(y) having a compensated brightness value. The final output brightness level LUT_new(y) is rounded off to be an integer.

Figure 4A:
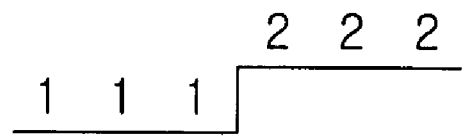
FIGS. 4A and 4B are views showing an output brightness level that is finally adjusted with respect to a brightness level of an input image signal according to the apparatus shown in FIG. 2.
Figure 4B:
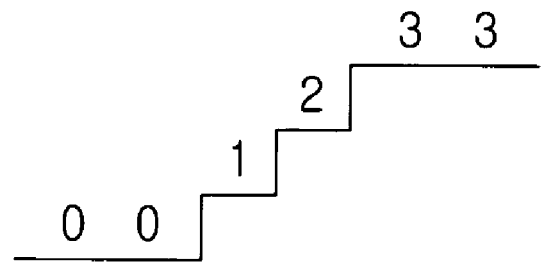

FIGS. 4A and 4B show the final output brightness level resulted by adjusting the brightness level of the input image signal by way of example. Referring to FIG. 4A, 6 signals, each of which are expressed by 8 bits, are sequentially input and have a brightness value 1 or 2, individually. Also, a contour line occurring between the third signal and the fourth signal means a change of a brightness level.

TABLE 1

| INPUT IMAGE SIGNAL | 1 | 1 | 1 | 2 | 2 | 2 |
|---|---|---|---|---|---|---|
| HPF | 0 | 0 | −0.25 | 0.25 | 0 | 0 |
| LPF | 1 | 1 | 1.25 | 1.75 | 2 | 2 |
| OUTPUT IMAGE SIGNAL | 0 | 0 | 1 | 2 | 3 | 3 |

The sequentially input image signals, each having 8 bits, has brightness levels '1→1→1→2→2→2' as shown in FIG. 4A and the Table 1. The input image signals are divided into high-frequency signals and low-frequency signals by a predetermined frequency band at the HPF 212 and the LPF 214 as shown in Table 1. The high-frequency signals '−0.25' and '0.25', which are expressed by 10 bits at the HPF 212, are assigned with the value '0.00" by the resolution changing unit 220. Accordingly, a composite image signal made by the adding unit 230 sequentially has a brightness level '1→1→1.25→1.75→2→2'. Consequently, the compensating value calculating unit 260 calculates the compensation value compensation (y) with respect to the brightness level-changed area by using the Equation 1 and the equalizing unit 250.

With reference to Table 1 and Equation 1, the compensation value of the third input signal is calculated by the following expansion;

$$\text{Compensation}(y) = (LUT(y-1) - LUT(y)) * (LSB\ 2\text{bit value})/4$$

$$= (LUT(2) - LUT(1)) * 0.25$$

$$= (3.0) * 0.25 = 0.75\ \text{rounded to } 1$$

The compensation value of the fourth image signal is calculated by the following expansion:

$$\text{Compensation}(y) = (LUT(y+1) - LUT(y)) * (LSB\ 2\text{bit value})/4$$

$$= (LUT2 - LUT1) * 0.75$$

$$= (3 - 0) * 0.75 = 2.25\ \text{rounded to } 2$$

The compensation values '1' and '2' are obtained by rounding-off to the nearest integer.

Finally, the compensation unit 270 adds the compensation value and the brightness value of the current pixel to thus obtain a compensated output image signal brightness value as shown in FIG. 4B and Table 1.

The quantization error compensation apparatus according to the present invention, improves an image quality by compensating for a low-frequency component that is discarded when the continuously input image signal is quantized. This is accomplished by a method of compensating for the difference between the brightness equalizing value of the brightness level of the pixel the current image signal and the brightness equalizing value of the next level of the brightness level of the pixel of the current image signal. Especially, by calculating the compensation value with respect to the area such as a contour line where the brightness of the image signal is suddenly changed, more natural brightness change can be obtained.

While not required in all aspects, it is understood that the present invention can be implemented using a chip and/or as a software program encoded on a computer readable medium readable by a computer.

The foregoing embodiments and advantages are merely exemplary and are not to be construed as limiting the present invention. The present teaching can be readily applied to other types of apparatuses. The description of the present invention is intended to be illustrative, and not to limit the scope of the invention as defined in the claims and equivalents thereof. Many alternatives, modifications, and variations will be apparent to those skilled in the art.

What is claimed is:

1. A quantization error compensation apparatus comprising:
  a frequency dividing unit to divide an input current image signal expressed by a level 1 into a first high-frequency signal and a low-frequency signal, wherein the first high-frequency signal is expressed by a level 2 extended from the level 1 and the low-frequency signal is expressed by a level 3 extended from the level 1, and to output the divided signal;
  a resolution-changing unit to cut m number of Least Significant Bits (LSB) of the first high-frequency signal and to insert a predetermined signal into a position from which the m LSBs were cut to output a second high-frequency signal;
  an adding unit to add the low-frequency signal and the second high-frequency signal to generate a composite signal;
  a quantization unit to cut n number of the LSBs of the composite signal and to output the cut composite signal and the n number of a bit signal;
  an equalizing unit to equalize the cut composite signal according to a predetermined brightness equalizing pattern and to output a first brightness equalizing value with respect to a brightness level of a pixel of the current image signal and a second brightness equalizing value with respect to a next level of the brightness level of the pixel of the current image signal;

a compensation value calculating unit to calculate a compensation value using the n number of the bit signal and a difference value between the first brightness equalizing value and the second brightness equalizing value; and a compensation unit to add the calculated compensation value and the first brightness equalizing value and to output an added value, wherein m and n are integers.

2. The quantization error compensation apparatus of claim 1, wherein the frequency dividing unit comprises:

a high pass filter to extract a frequency signal at or greater than a predetermined frequency from the current image signal expressed by the level 1 and changing the level 1 to the level 2 to output the first high-frequency signal; and a low pass filter to extract a frequency signal smaller than the predetermined frequency from the current image signal expressed by the level 1 and changing the level 1 to the level 3 to thereby output the low-frequency signal.

3. The quantization error compensation apparatus of claim 2, wherein the high pass filter and the low pass filter are mirror filters.

4. The quantization error compensation apparatus of claim 1, wherein the predetermined signal to be inserted into the position from which the m LSBs were cut is a signal '0'.

5. The quantization error compensation apparatus of claim 1, wherein the equalizing unit includes a look-up table which stores the brightness equalizing pattern.

6. The quantization error compensation apparatus of claim 1, wherein the compensation value calculating unit comprises:

a subtracting portion to calculate a difference value between the first brightness equalizing value and the second brightness equalizing value; and a multiplying portion to multiply the difference value by the cut n number of the bit signal to obtain the compensation value.

7. The quantization error compensation apparatus of claim 1, wherein the m and n are a same positive integer.

8. A quantization error compensation method, comprising:

dividing an input current image signal expressed by a level 1 into a first high-frequency signal and a low-frequency signal, the first high-frequency signal being expressed by a level 2 extended from the level 1 and the low-frequency signal being expressed by a level 3 extended from the level 1, and outputting the divided signal;

cutting m number of Least Significant Bits (LSB) of the first high-frequency signal and inserting a predetermined signal into a position from which the m LSBs were cut to output a second high-frequency signal;

adding the low-frequency signal and the second high-frequency signal to create a composite signal;

quantizing the composite signal by cutting an n number of the LSBs of the created composite signal and outputting the cut composite signal and the n number of a bit signal;

equalizing the cut composite signal according to a predetermined brightness equalizing pattern to produce a first brightness equalizing value with respect to a brightness level of a pixel of the current image signal and a second brightness equalizing value with respect to a next level of the brightness level of the pixel of the current image signal;

calculating a compensation value by using the cut n number of the bit signal and a difference value between the first and second brightness equalizing values; and adding the calculated compensation value and the first brightness equalizing value and outputting an added value, wherein m and n are integers.

9. The quantization error compensation method of claim 8, wherein the predetermined signal to be inserted into the cut position is a signal '0'.

10. The quantization error compensation method of claim 8, wherein the predetermined brightness equalizing pattern is stored in a look-up table.

11. The quantization error compensation method of claim 8, wherein the calculating the compensation value comprises:

calculating the difference value between the first brightness equalizing value and the second brightness equalizing value; and multiplying the difference value by the cut n number of the bit signal to obtain the compensation value.

12. The quantization error compensation method of claim 8, wherein the m and n are a same positive integer.

13. A quantization error compensation apparatus for adjusting a brightness level of a current image signal, the apparatus comprising:

a replacement unit to replace a portion of the current image signal within a predetermined frequency band with a predetermined signal so as to produce a composite signal;

a quantization unit to remove a portion of the composite signal and to output the cut composite signal and the portion of the composite signal;

an equalizing unit to equalize the cut composite signal according to a predetermined brightness equalizing pattern and to output a first brightness equalizing value for the brightness level of the current image signal and a second brightness equalizing value for a next brightness level of the current image signal;

a calculating unit to calculate a compensation value using the portion of the composite signal and the first and second brightness equalizing values; and a compensation unit to combine the compensation value and the first brightness equalizing value so as to compensate an area of the current image signal at which occurs a change in the brightness level.

14. The quantization error compensation apparatus of claim 13, wherein the replacement unit comprises:

a frequency dividing unit to divide the current image signal into a first signal and a second signal;

a resolution-changing unit to replace a first portion of the first signal with the predetermined signal so as to produce a third signal; and a combining unit to combine the second signal and the third signal to generate the composite signal.

15. The quantization error compensation apparatus of claim 14, wherein:

the current image signal is expressed by a level 1;

the first signal is a first high-frequency signal expressed by a level 2 extended from the level 1; and the second signal is a low-frequency signal expressed by a level 3 extended from the level 1.

16. The quantization error compensation apparatus of claim 14, wherein the resolution-changing unit cuts m number of Least Significant Bits (LSB) of the first signal and inserts the predetermined signal into a position from which the m LSBs were cut to produce the third signal.

17. The quantization error compensation apparatus of claim 13, wherein the quantization unit cuts n number of Least Significant Bits (LSB) of the composite signal and outputs the n number of a bit signal as the portion of the composite signal.

18. The quantization error compensation apparatus of claim 13, wherein, in calculating the compensation value, the calculating unit obtains a difference value between the first and second brightness equalizing values and multiplies the difference value by the portion of the composite signal.

19. The quantization error compensation apparatus of claim 18, wherein the quantization unit cuts n number of Least Significant Bits (LSB) of the composite signal and outputs the n number of a bit signal as the portion of the composite signal.

20. The quantization error compensation apparatus of claim 14, wherein:
    the frequency dividing unit divides the current image signal into the first signal having a first number of bits and the second signal having a second number of bits;
    the resolution-changing unit includes an up-scaling unit which produces the third signal having the second number of bits; and
    the combining unit combines the second signal and the third signal to generate the composite signal having the second number of bits.

21. The quantization error compensation apparatus of claim 20, wherein:
    the quantization unit cuts n number of Least Significant Bits (LSB) of the composite signal and outputs the n number of a bit signal as the portion of the composite signal; and
    the compensation value is calculated as follows:

$$\text{Compensation}(y) = (LUT(y+1) - LUT(y)) * (n \text{ number of the bit signal})/A$$

where the compensation (y) denotes the compensation value,
    the LUT(y+1) denotes the second brightness equalizing value with respect to the next brightness level of a pixel of the current image signal,
    the LUT(y) denotes the first brightness equalizing value with respect to the brightness level of the pixel of the current image signal, and
    A is a difference between the first signal and the second signal.

22. A computer readable medium encoded with processing instructions for performing a method of compensating a quantization error in a current image signal using a computer, the method comprising:
    replacing a portion of the current image signal within a predetermined frequency band with a predetermined signal so as to produce a composite signal;
    quantizing the composite signal including removing a portion of the composite signal and outputting the cut composite signal and the portion of the composite signal;
    equalizing the cut composite signal according to a predetermined brightness equalizing pattern so as to output a first brightness equalizing value for the brightness level of the current image signal and a second brightness equalizing value for a next brightness level of the current image signal;
    calculating a compensation value using the portion of the composite signal and the first and second brightness equalizing values; and
    combining the compensation value and the first brightness equalizing value so as to compensate an area of the current image signal at which occurs a change in the brightness level.

23. The computer readable medium of claim 22, wherein the replacing the portion comprises:
    dividing the current image signal into a first signal and a second signal;
    replacing a first portion of the first signal with the predetermined signal so as to produce a third signal; and
    combining the second signal and the third signal to generate the composite signal.

24. The computer readable medium of claim 23, wherein:
    the current image signal is expressed by a level 1;
    the first signal is a first high-frequency signal expressed by a level 2 extended from the level 1; and
    the second signal is a low-frequency signal expressed by a level 3 extended from the level 1.

25. The computer readable medium of claim 23, wherein the replacing the first portion comprises:
    cutting m number of Least Significant Bits (LSB) of the first signal, and
    inserting the predetermined signal into a position from which the m LSBs were cut to produce the third signal.

26. The computer readable medium of claim 22, wherein the quantizing the composite signal comprises:
    cutting n number of Least Significant Bits (LSB) of the composite signal, and
    outputting the n number of a bit signal as the portion of the composite signal.

27. The computer readable medium of claim 22, wherein the calculating the compensation value comprises:
    obtaining a difference value between the first and second brightness equalizing values, and
    multiplying the difference value by the portion of the composite signal.

28. The computer readable medium of claim 27, wherein the quantizing the composite signal comprises:
    cutting n number of Least Significant Bits (LSB) of the composite signal, and
    outputting the n number of a bit signal as the portion of the composite signal.

29. The computer readable medium of claim 23, wherein:
    the dividing the current image signal comprises dividing the current image signal into the first signal having a first number of bits and the second signal having a second number of bits;
    the replacing the first portion of the first signal further comprises producing the third signal having the second number of bits; and
    the combing the second signal and the third signal comprising combining the second signal and the third signal to generate the composite signal having the second number of bits.

30. The computer readable medium of claim 29, wherein:
    the quantizing the composite signal comprises:
    cutting n number of Least Significant Bits (LSB) of the composite signal, and
    outputting the n number of a bit signal as the portion of the composite signal; and the calculating the compensation value comprises:

$$\text{Compensation}(y) = (LUT(y+1) - LUT(y)) * (n \text{ number of the bit signal})/A$$

where the compensation (y) denotes the compensation value, the LUT(y+1) denotes the second brightness equalizing value with respect to the next brightness level of a pixel of the current image signal, the LUT(y) denotes the first brightness equalizing value with respect to the brightness level of the pixel of the current image signal, and A is a difference between the first signal and the second signal.

* * * * *

UNITED STATES PATENT AND TRADEMARK OFFICE
CERTIFICATE OF CORRECTION

| | |
|---|---|
| PATENT NO. | : 7,203,375 B2 |
| APPLICATION NO. | : 10/614793 |
| DATED | : April 10, 2007 |
| INVENTOR(S) | : Yung-jun Park et al. |

It is certified that error appears in the above-identified patent and that said Letters Patent is hereby corrected as shown below:

Column 12, Line 54, change "combing" to --combining--.

Signed and Sealed this

Seventh Day of August, 2007

JON W. DUDAS
*Director of the United States Patent and Trademark Office*